US010667122B2

(12) United States Patent
Jactat

(10) Patent No.: US 10,667,122 B2
(45) Date of Patent: May 26, 2020

(54) RADIO ACCESS NETWORK INTERWORKING

(71) Applicant: JRD COMMUNICATION INC., Guangdong (CN)

(72) Inventor: Caroline Jactat, Guangdong (CN)

(73) Assignee: JRD COMMUNICATION INC., Shenzhen (CN)

( * ) Notice: Subject to any disclaimer, the term of this patent is extended or adjusted under 35 U.S.C. 154(b) by 0 days.

(21) Appl. No.: 15/526,729

(22) PCT Filed: Sep. 28, 2016

(86) PCT No.: PCT/CN2016/100493
§ 371 (c)(1),
(2) Date: May 12, 2017

(87) PCT Pub. No.: WO2017/063502
PCT Pub. Date: Apr. 20, 2017

(65) Prior Publication Data
US 2018/0352420 A1    Dec. 6, 2018

(30) Foreign Application Priority Data
Oct. 13, 2015    (GB) .................................. 1518053.2

(51) Int. Cl.
*H04W 8/18*    (2009.01)
*H04W 8/20*    (2009.01)
(Continued)

(52) U.S. Cl.
CPC .............. *H04W 8/18* (2013.01); *H04W 8/04* (2013.01); *H04W 8/20* (2013.01); *H04W 24/02* (2013.01);
(Continued)

(58) Field of Classification Search
CPC ....... H04W 8/18; H04W 76/25; H04W 76/15; H04W 76/16; H04W 8/04; H04W 8/20;
(Continued)

(56) References Cited

U.S. PATENT DOCUMENTS

2014/0307586 A1    10/2014    Zhang et al.
2015/0111600 A1*    4/2015    Liu .......................... H04W 4/02
455/456.1
(Continued)

FOREIGN PATENT DOCUMENTS

CN    103379590 A    10/2013
CN    103391632 A    11/2013
(Continued)

OTHER PUBLICATIONS

International Search Report issued in International Patent Application No. PCT/CN2016/100493 dated Nov. 29, 2016.
(Continued)

*Primary Examiner* — Eric Myers
(74) *Attorney, Agent, or Firm* — Baker & Hostetler LLP

(57) ABSTRACT

Methods to allow the interworking of cellular and WLAN networks, and in particular the offloading of data from a cellular network to a WLAN network. User preferences for non-operator controlled WLAN access points are communicated between mobile devices, the core network, and radio access network to allow offloading to respect those preferences.

6 Claims, 3 Drawing Sheets

(51) Int. Cl.
*H04W 76/15* (2018.01)
*H04W 76/25* (2018.01)
*H04W 76/16* (2018.01)
*H04W 8/04* (2009.01)
*H04W 24/02* (2009.01)
*H04W 40/24* (2009.01)
*H04W 84/12* (2009.01)
*H04W 92/02* (2009.01)
*H04W 88/06* (2009.01)
*H04W 88/10* (2009.01)

(52) U.S. Cl.
CPC ......... *H04W 40/248* (2013.01); *H04W 76/15* (2018.02); *H04W 76/16* (2018.02); *H04W 76/25* (2018.02); *H04W 84/12* (2013.01); *H04W 88/06* (2013.01); *H04W 88/10* (2013.01); *H04W 92/02* (2013.01)

(58) Field of Classification Search
CPC ... H04W 24/02; H04W 40/248; H04W 84/12; H04W 88/06; H04W 88/10; H04W 92/02
See application file for complete search history.

(56) References Cited

U.S. PATENT DOCUMENTS

| | | | | |
|---|---|---|---|---|
| 2017/0188253 | A1* | 6/2017 | Bergstrom | H04W 36/00835 |
| 2018/0242386 | A1* | 8/2018 | Ke | H04W 24/10 |
| 2018/0262465 | A1* | 9/2018 | Maattanen | H04W 12/02 |

FOREIGN PATENT DOCUMENTS

| | | |
|---|---|---|
| CN | 103391633 A | 11/2013 |
| EP | 1 545 146 A2 | 6/2005 |
| WO | 2014/035619 A1 | 3/2014 |
| WO | 2014/165832 A1 | 10/2014 |
| WO | 2015/183415 A1 | 12/2015 |

OTHER PUBLICATIONS

3GPP Draft; R2-153150; Aug. 24-28, 2015; Mobile Competence Centre, 650, route des Lucioles, F-06921 Sophia-Antipolis Cedex, France; "UE behaviours of different UE and Network conditions in LTEWLAN integrated Network Environment"; XP050991644.
UKIPO Search Report in Great Britain Patent Application No. 1518053.2 dated Mar. 1, 2016.

* cited by examiner

RADIO ACCESS NETWORK INTERWORKING

CROSS-REFERENCE TO RELATED APPLICATIONS

This application is a National Stage of International patent application PCT/CN2016/100493, filed on Sep. 28, 2016, which claims priority to foreign Great Britain patent application No. 1518053.2, filed on Oct. 13, 2015, the disclosures of which are incorporated by reference in their entirety.

TECHNICAL FIELD

This disclosure relates to interworking of Radio Access technologies, and in particular to the specification of user preferences in LTE and Wi-Fi interworking.

BACKGROUND

Wi-Fi is a wireless data communication and networking technology, specified by the Institute of Electrical and Electronics Engineers (IEEE) 802.11 family of standards which define the physical layer (PHY) and medium access control (MAC) layer of the Open Systems Interconnection model (OSI Model).

Wi-Fi, and other non-3GPP standardised radio access technologies, provide radio coverage over relatively small areas, but at relatively high data rates. Such technologies are commonly referred to as Wireless Local Access Networks (WLAN). The use of unrestricted radio spectrum and relatively low-cost equipment for the provided data rates, has led to widespread deployment of WLAN access points. Access points may be private or public, with many commercial access points being positioned in public locations for use by customers. Access points may be managed and controlled by the cellular network providers/operators ("operator controlled access points"), or may be independent ("non-operator controlled access points").

It is now common for mobile devices (UEs) be capable of establishing both cellular and WLAN connections. Where a UE has both a cellular and WLAN connection simultaneously it is common for the user to select which connection to use, and for the UE to route traffic accordingly. For example, when a UE connects to a user's home Wi-Fi network, the user's preferences set in the UE may indicate that all traffic should be routed by the UE via the Wi-Fi connection as opposed to the cellular connection.

3GPP LTE Release 12 introduced LTE/WLAN interworking to allow connection of a WLAN access points to an LTE core network, such that the WLAN access points act as a Radio Access Network (RAN) for the core network. Such an arrangement allows traffic to be routed via a WLAN, rather than the cellular RAN when the WLAN route is preferable. A UE connected to the cellular LTE RAN may measure signals received from WLAN access points and transmit those to the LTE RAN as options to provide services to the UE. The RAN may in turn report available access points to the core network, which may offload some or all traffic to that access point. The operator's core network is thus able to utilise either the operator's cellular network or WLAN network to serve their customers.

The 3GPP TS 24.312 LTE standard defines a core network entity known as the Access Network Discovery and Selection Function (ANDSF) which provides functions to assist UEs to discover non-cellular access networks, such as WLANs. UEs connecting to WLAN access points can transmit details of the access point (such as location and authentication details) to the ANDSF. Other UEs can then retrieve and utilise the information to discover and connect to the access point.

3GPP LTE Release 13 delegates more control to the LTE RAN to allow the LTE RAN to take decisions on the most appropriate RAN (LTE or Wi-Fi) for a UE. This functionality is known as LTE WLAN aggregation (LWA) as per 3GPP TS 36.300. However, user preferences specified at the UE should be taken into account by the LWA functionality. For example, a UE may be connected to an operator controlled access point and traffic may be routed to the UE using a combination of the LTE and WLAN access networks under the LWA procedures. If the UE comes within range of a non-operator controlled WLAN access point (WLAN-U), for which the user has specified a preference, for example their home Wi-Fi access point, LWA should respect that preference and all data should be sent via that non-operator controlled access point.

However, under the current systems, the RAN is not aware of user preferences for a WLAN-U and thus cannot terminate LWA to respect that preference.

It has been proposed that this situation be addressed by communicating preferences from the UE application layers (e.g. Connection Manager of Android OS) to the radio protocol layers for communication to the LTE RAN. These preferences can then be considered by the LWA function when deciding how to serve the UE. However, such behaviour requires modification of UE functionality and is therefore dependent on those UE operating system providers implementing the function.

It has also been proposed that WLAN access points transmit information on their UE connections to the LTE RAN. The LTE RAN can then consider this information in implementing LWA for a UE which is indicated as connected to a WLAN access point. However, this requires the providers of WLAN access points to modify their devices to make the required transmissions. It is unlikely that manufacturers and suppliers of non-operator controlled WLAN access points would make such modifications and therefore operation and widespread deployment cannot be assured.

There is therefore a requirement for a reliable means for LWA to account for user preferences specified at a UE.

The embodiments described below are not limited to implementations which solve any or all of the disadvantages of known systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method for interworking radio access networks, the method comprising the steps of receiving at a cellular radio access network from a mobile device connected to that cellular radio access network WLAN access point data, wherein the WLAN access point data comprises at least one of WLAN access point ID, LTE radio cell ID, and LTE neighbour cell identities storing the data at the cellular radio access network, and utilising the stored data to control a WLAN aggregation function for the mobile device.

The received data may comprise an indication of a user's preference for data to be routed by an indicated non-operator controlled WLAN access point.

The cellular radio access network may additionally store data identifying the radio cell to which the mobile device was connected when WLAN access point data was received.

The method may further comprise the step of transmitting data derived from the WLAN access point data to a component of the core network.

The aggregation function may be disabled based on the stored data.

The WLAN access point data may further comprise at least one of, LTE Tracking Area, access point geolocation, and LTE Radio fingerprints.

There is also provided a method for interworking radio access networks, the method comprising the steps of transmitting WLAN access point data from a mobile device to a network management function of a cellular core network, wherein the data comprises information regarding a non-operator controlled WLAN access point, storing data derived from the WLAN access point data in a component of the core network, the stored data being associated with the mobile device from which the WLAN access point data was received, transmitting data from the cellular core network to a cellular radio access network to which the mobile device is connected, wherein the data comprises data derived from the WLAN access point data, and at the cellular radio access network modifying a WLAN aggregation function for the mobile device based on the data derived from the WLAN access point data.

The WLAN aggregation may be disabled for the user equipment if the data received at the radio access network indicates the user equipment is connected to a non-operator controlled WLAN access point.

The method may further comprise the step of storing the data at the cellular radio access network.

The WLAN access point data may identify a WLAN access point for which the user of the mobile device has a preference.

The cellular network may be an LTE network and the WLAN aggregation function may be the LWA process.

The network management function may be an Access Network Discovery and Selection Function component.

The component of the core network at which the data is stored may be the Home Subscriber Server.

The method may further comprise the step of the Home Subscriber Server communicating data derived from the WLAN access point data to the relevant MME for the mobile device using the insert subscriber data procedure.

The WLAN access point data may comprise at least one of, WLAN access point ID, LTE radio cell ID, LTE Tracking Area, access point geolocation, and LTE Radio fingerprints.

The WLAN access point data may be transmitted from the mobile device to the network management function in a UE Location Management Object.

The data may be transmitted to the radio access network using a UE Context Modification Request message.

There is also provided a method for interworking radio access networks performed at a radio access network of a cellular network, the method comprising the steps of establishing a cellular connection with a mobile device, modifying a WLAN aggregation function based on data stored at the radio access network identifying user preferences for a non-operator controlled WLAN access point.

WLAN aggregation may be disabled for the user equipment if the data stored at the radio access network indicates the user equipment is connected to a non-operator controlled WLAN access point.

The data stored may identify a WLAN access point for which the user of the mobile device has a preference.

The cellular network may be an LTE network and the WLAN aggregation function is the LWA process.

The WLAN access point data may comprise at least one of, WLAN access point ID, LTE radio cell ID, LTE Tracking Area, and LTE Radio fingerprints.

There is also provided a method for interworking radio access networks, the method comprising the steps of transmitting WLAN access point data in a Non-Access Stratum signalling message from a mobile device to a cellular core network, wherein the data comprises information regarding a non-operator controlled WLAN access point, storing data derived from the WLAN access point data in a component of the core network, the stored data being associated with the mobile device from which the WLAN access point data was received, transmitting data from the cellular core network to a cellular radio access network to which the mobile device is connected, wherein the data comprises data derived from the WLAN access point data, and at the cellular radio access network modifying a WLAN aggregation function for the mobile device.

The WLAN aggregation may be disabled for the user equipment if the data received at the radio access network indicates the user equipment is connected to a non-operator controlled WLAN access point.

The method may further comprise the step of storing the data at the cellular radio access network.

The WLAN access point data may identify a WLAN access point for which the user of the mobile device has a preference.

The cellular network may be an LTE network and the WLAN aggregation function is the LWA process.

The component of the core network at which the data is stored may be the Home Subscriber Server.

The method may further comprise the step of the Home Subscriber Server communicating data derived from the WLAN access point data to the relevant MME for the mobile device using the insert subscriber data procedure.

The WLAN access point data may comprise at least one of, WLAN access point ID, LTE radio cell ID, LTE Tracking Area, access point geolocation, and LTE Radio fingerprints.

The data may be transmitted to the radio access network using a UE Context Modification Request message There is also provided a method of controlling WLAN aggregation at a cellular radio access network, comprising the steps of receiving a connection request from a mobile device, retrieving stored WLAN access point information based on an identity of the mobile device, and modifying a WLAN aggregation function for the mobile device based on the retrieved data.

The WLAN aggregation function may be modified based on the retrieved data and the cell identity to which the mobile device is connected.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
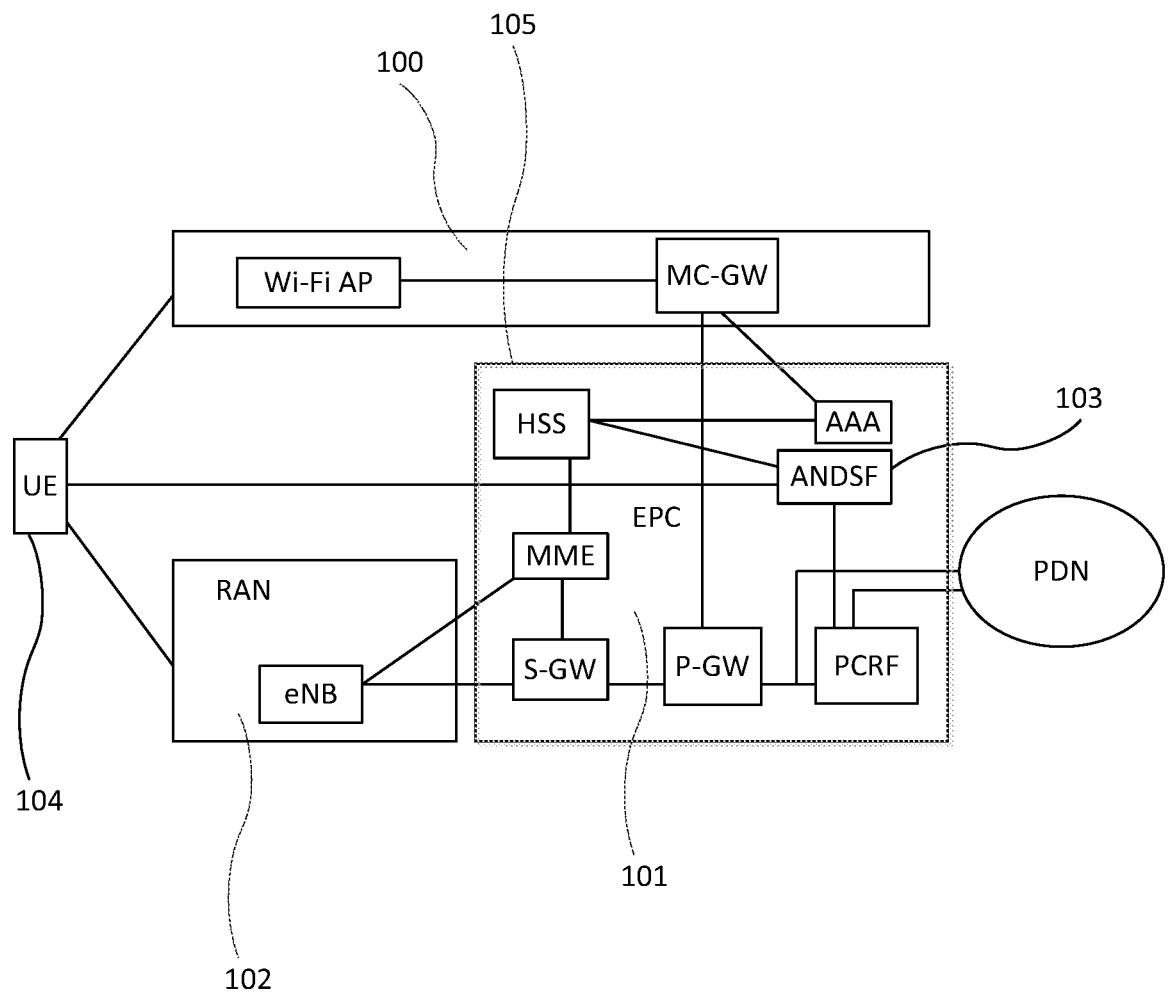
FIG. 1 shows a schematic network diagram.

FIG. 1 shows a schematic diagram of selected elements of an LTE network, and a WLAN, utilising WLAN/LTE interworking.

The WLAN 100 has an interface to the LTE Evolved Packet Core (EPC) 101 to allow offloading of data from the LTE RAN 102 to the WLAN 100. The ANDSF 103 has interfaces to the UE 104 (S14 interface) and the HSS 105 for the storing and accessing information on non-3GPP (e.g. WLAN) access points.

As explained in more detail below, in a first method, a UE connecting to a WLAN-U notifies the ANDSF of the access point, and the ANDSF stores data in the HSS for the UE. The HSS interacts with the LTE core network and transmits a UE context modification request to the LTE RAN such that the LWA function can consider the change in UE's status. For example, if it is indicated that the user prefers all or some data to be sent via the WLAN-U to which it is connected, LWA may deactivate all or some offloading to an operator controlled access point.

Figure 2:
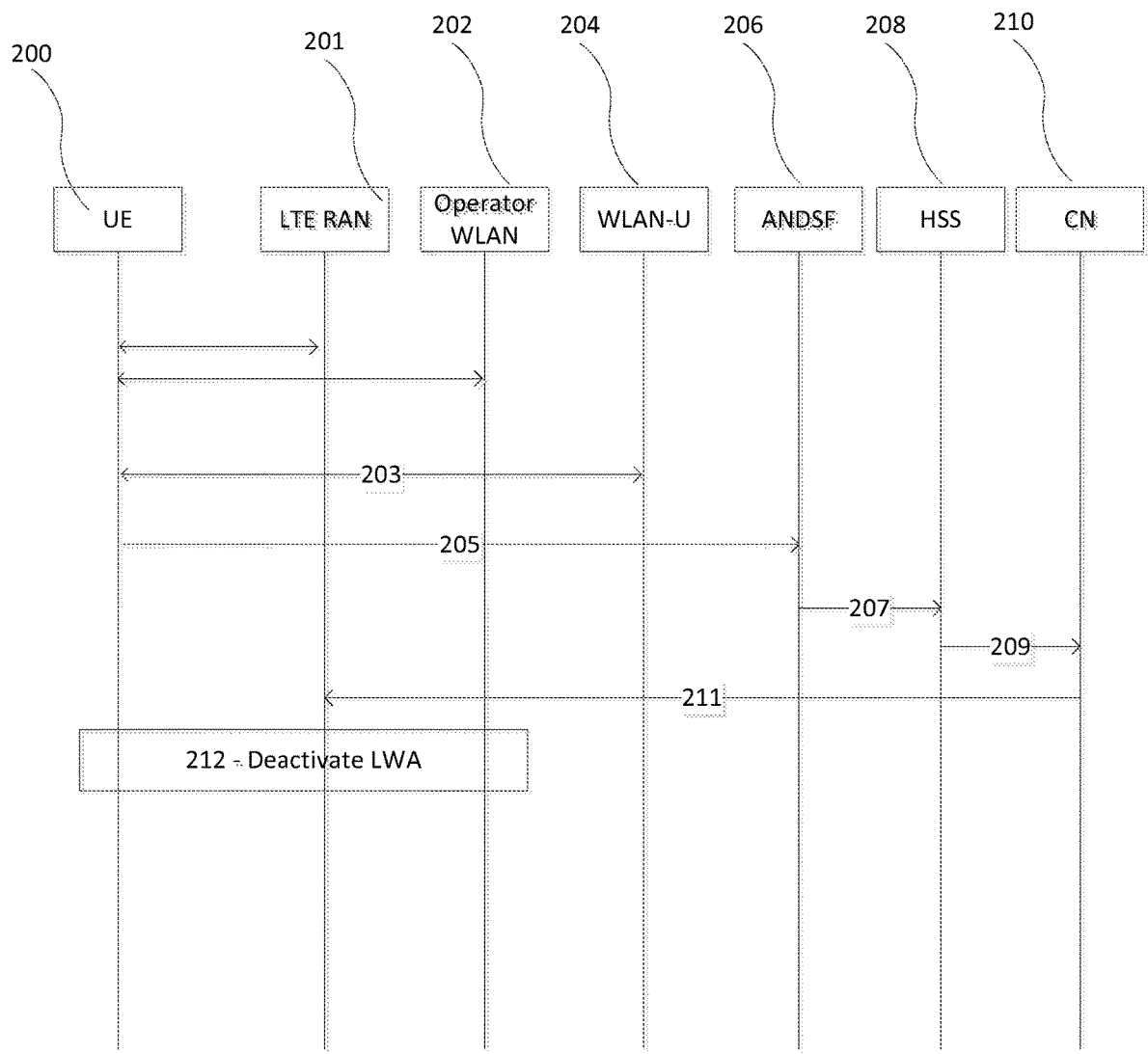
FIG. 2 shows a signalling diagram for an example of network interworking.

FIG. 2 shows a signalling diagram for indicating user-preferences for WLAN access point use.

A UE 200 is connected to an LTE RAN 201 and an operator controlled WLAN access point 202 for which LWA is activated. At step 203 the UE connects to a WLAN-U 204. At step 205 the UE 200 transmits an indication to the ANDSF 206 including data which identifies the WLAN-U. The transmitted data may include other information, for example LTE Tracking Area Identity, LTE radio cell identity, LTE radio fingerprints, or LTE neighbour radio cell identities. This information may be provided in a UE Location Management Object (MO) request as defined in TS 24.312.

At step 207 the ANDSF 205 transmits the access point information to the relevant connected HSS 208. For example, the access point identity and/or actual geolocation may be transmitted in association with the identity of the UE 200. The HSS 208 stores the information with the subscriber information in its records.

For example, the data may be stored in a table according to Table 5.7.1-1 of TS 23.401 which defines the data to be stored at the HSS. The International Mobile Subscriber Identity (IMSI) is the primary key for the table and is related to the user (as opposed to the UE). Various data may be stored in that table including access point preferences including ID, location, overlaid tracking area, and LTE radio access cell ID.

Upon receipt of the new data in step 207, the HSS notifies (step 209) the core network 210 (for example the MME and SGSN) of the new connection data. This data may be transmitted using the "Insert Subscriber Data" procedure set out in Clause 5.2.2.1.1 of TS 29.272. Upon receipt of the data the core network 210 stores that data in the MME component, for example as an additional entry in the data set out at Clause 5.7.2 of TS 23.401. The data stored in the MME is utilised to monitor and control UE mobility and the routing of Packet Data Network (PDN) connections.

At step 211 the core network transmits the new connection information to the LTE RAN 201. For example, a "UE Context Modification Request" message", as set out in Clause 8.3.4.1 of TS 36.413 may be transmitted from the MME to the relevant eNB. For example a "User WLAN" Information Element (IE) may be added to the UE Context Modification Request message, which IE comprises the information on the WLAN access point. Upon receipt the eNB stores the IE, and utilises it to define LWA behaviour.

At step 212, based on the information received, the RAN deactivates any LWA for the relevant UE such that all or some of traffic is routed under the control of the UE 200 via the WLAN-U 204. The data may include the Bearer IDs for the relevant data bearers, thus allowing them to be redirected to the appropriate WLAN access point 204. The Bearer ID identifies the traffic bearer between the Core Network and the UE, and the Radio Bearer ID identifies the traffic bearer between the Radio Access Network and the UE. There is a one-to-one mapping of the Bearer ID to the Radio Bearer ID between the CN and the RAN, such that the Core Network can inform the Radio Access Network of which traffic is subject to LWA or not.

The eNB may utilise the stored information to configure LWA behaviour if the UE connects to the eNB again in the future. For example, LWA may not be activated for that UE.

The procedures described with reference to FIG. 2 thus allows user-specified preferences to be accommodated without requiring modification of UE or WLAN devices, thus keeping development and deployment of the system within the control of the cellular network equipment providers. This simplifies standardisation and implementation of the technologies by avoiding the need for interworking of diverse technologies and devices.

Figure 3:
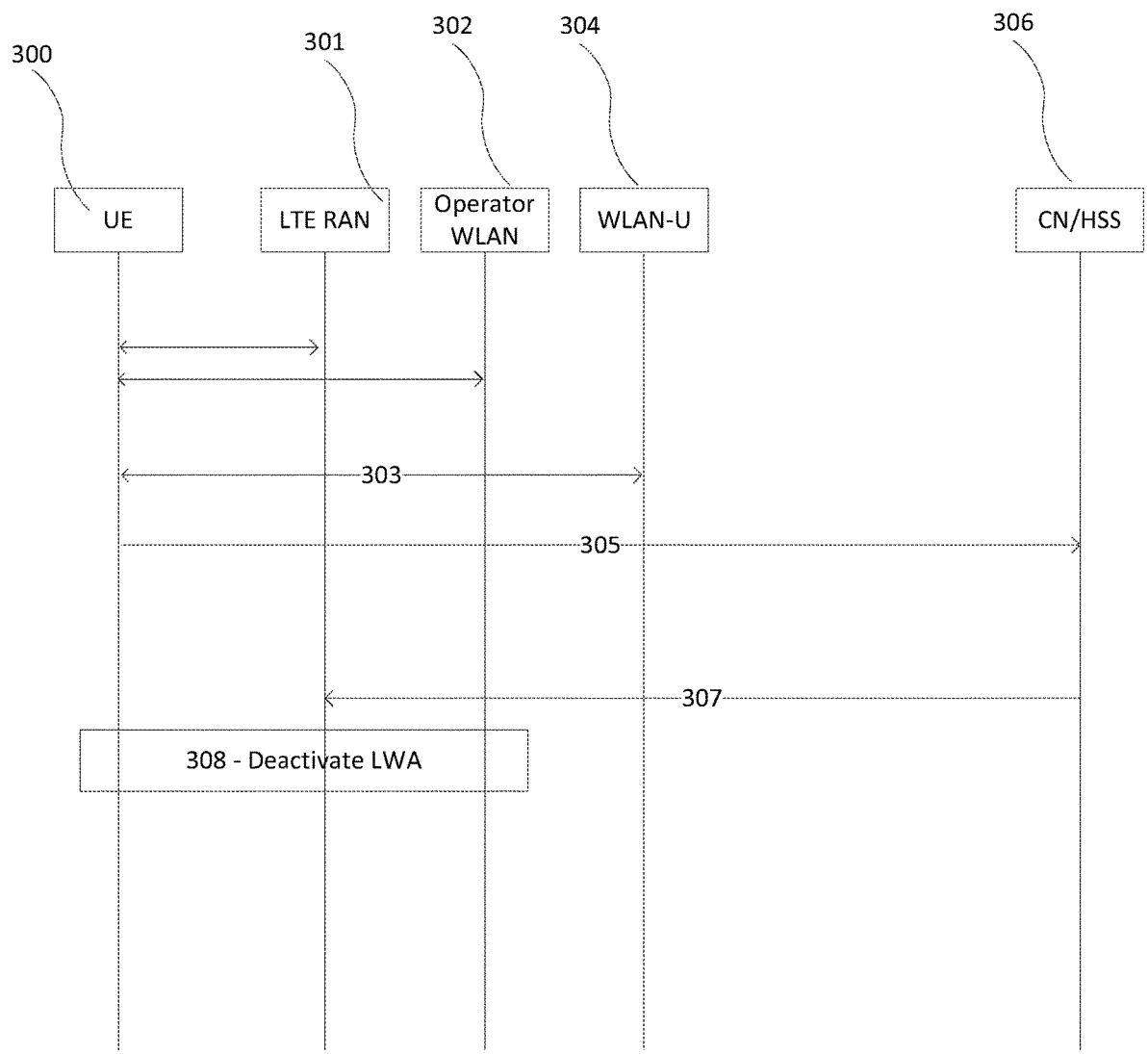
FIG. 3 shows a signalling diagram for a further example of network interworking.

FIG. 3 shows a signalling diagram for a further method to share WLAN access point preferences and utilise those in LWA control.

A UE 300 is connected to an LTE RAN 301 and an operator controlled WLAN access point 302 for which LWA is activated. At step 303 the UE connects to a WLAN-U 304. At step 305 the UE transmits information regarding the WLAN-U 304 to the core network 306 in an NAS signalling message. The message may also include other relevant data such as LTE radio cell identity, Bearer IDs, LTE Tracking Area, and LTE neighbour cell identities, and LTE Radio fingerprints. The information is stored at the HSS and the MME in relation to the user registration.

In an example the data may be transmitted using a NAS Attach or NAS Tracking Area Update message.

At step 307 the core network transmits the new connection information to the LTE RAN 201. For example, a "UE Context Modification Request" message", as set out in Clause 8.3.4.1 of TS 34.413 may be transmitted from the MME to the relevant eNB. For example a "User WLAN" Information Element (IE) may be added to the UE Context Modification Request message, which IE comprises the information on the WLAN access point. Upon receipt the eNB stores the IE, and utilises it to define LWA behaviour.

At step 308, based on the information received, the RAN deactivates any LWA for the relevant UE such that the traffic is routed under the control of the UE 300 via the WLAN-U 204. The data may include Bearer IDs for the relevant data bearers, thus allowing them to be redirected to the appropriate WLAN access point 304.

The eNB may utilise the stored information to configure LWA behaviour if the UE connects to the eNB again in the future. For example, LWA may not be activated for that UE.

This method has the advantages that the UE provides the user preference related to WLAN access point upon user registration to the LTE network or upon change in the user preference using the tracking area update procedure. This is an alternate option to the ANDSF function which implies the Core Network has to collect the successive user preference information whenever the UE connects to the WLAN access point.

A further method to share WLAN access point preferences and utilise those in LWA control can consist in UE providing some indication that the current connected-to WLAN is part of user preference to the RAN. As a consequence, the RAN stores the WLAN access point ID, LTE radio cell ID, LTE Tracking Area, LTE neighbour cell identities, and LTE Radio fingerprints. The eNodeB may utilise the stored information to configure LWA behaviour if the UE connects to the eNodeB again in the future. For example, LWA may not be activated for that UE. The eNodeB may transmit the stored information to the MME. As a consequence, the MME would provide back such information to the eNodeB upon UE registration to the LTE radio network in the future for use in modifying LWA behaviour on a subsequent connection by the same UE.

Those skilled in the art will appreciate that methods according to the embodiments may be carried out by software computer programs, hardware, or a combination of software and hardware.

These methods are provided by way of example only. The disclosure of this application is not restricted by the specific combination of steps shown in the figures, and described herein, but includes any appropriate subsets or combinations of steps performed in any appropriate order. Sections of the method may be performed in parallel.

The term 'user equipment' (UE) is used herein to refer to any device with processing and telecommunication capability such that it can perform the methods according to the embodiments of the present invention. Those skilled in the art will realize that such processing and telecommunication capabilities can be incorporated into many different devices and therefore the term 'user equipment' includes mobile telephones, personal digital assistants, PCs and many other devices.

Although in the embodiments and examples described above, only LTE and Wi-Fi are described as exemplary radio access technologies, it will be appreciated that the method of the embodiments of the present invention apply to any other radio access technologies without losing the effect sought.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A method for interworking radio access networks, the method comprising:
   receiving at a cellular radio access network from a mobile device connected to that cellular radio access network WLAN access point data,
   wherein the WLAN access point data comprises WLAN access point ID, LTE radio cell ID and LTE neighbour cell identities,
   storing the WLAN access point ID, and the LTE radio cell ID or LTE neighbor cell identities at the cellular radio access network, and
   utilising all elements of the stored WLAN access point data to control a WLAN aggregation function for the mobile device,
   wherein the WLAN access point data identifies a WLAN-U (a non-operator controlled WLAN access point) the UE is connected to.

2. The method according to claim 1, wherein the received data comprises an indication of a user's preference for data to be routed by an indicated non-operator controlled WLAN access point.

3. The method according to claim 1, wherein the cellular radio access network additionally stores data identifying the radio cell to which the mobile device was connected when WLAN access point data was received.

4. The method according to claim 1, further comprising transmitting data derived from the WLAN access point data to a component of the core network.

5. The method according to claim 1, wherein the aggregation function is disabled based on the stored data.

6. The method according to claim 1, wherein the WLAN access point data further comprises at least one of, LTE Tracking Area, access point geolocation, and LTE Radio fingerprints.

* * * * *